(12) United States Patent       (10) Patent No.:     US 7,728,918 B2
    Sakurai                      (45) Date of Patent:      Jun. 1, 2010

(54) ELECTRO-OPTICAL DEVICE AND ELECTRONIC APPARATUS

(75) Inventor: Shinji Sakurai, Nagano (JP)

(73) Assignee: Seiko Epson Corporation (JP)

( * ) Notice: Subject to any disclaimer, the term of this patent is extended or adjusted under 35 U.S.C. 154(b) by 454 days.

(21) Appl. No.: 11/236,753

(22) Filed: Sep. 27, 2005

(65) Prior Publication Data

US 2006/0098392 A1     May 11, 2006

(30) Foreign Application Priority Data

Nov. 8, 2004    (JP) ............................. 2004-323215

(51) Int. Cl.
    *G02F 1/1333*    (2006.01)
    *G02F 1/1345*    (2006.01)
(52) U.S. Cl. ........................ 349/58; 349/150
(58) Field of Classification Search ............ 349/58–60, 349/150; 361/520, 681
    See application file for complete search history.

(56) References Cited

U.S. PATENT DOCUMENTS

| 5,479,285 | A  | * | 12/1995 | Burke ........................... 349/58 |
| 6,330,148 | B1 | * | 12/2001 | Won et al. ..................... 361/681 |
| 6,515,721 | B2 | * | 2/2003  | Jin et al. ........................ 349/58 |
| 6,760,083 | B2 | * | 7/2004  | Lai .............................. 349/58 |
| 6,771,332 | B2 |   | 8/2004  | Yamada |
| 2003/0067577 | A1 | * | 4/2003 | Yamada ..................... 349/150 |
| 2004/0066473 | A1 |   | 4/2004 | Fukuwaki |
| 2004/0183959 | A1 | * | 9/2004 | Ishida ......................... 349/58 |
| 2005/0068472 | A1 | * | 3/2005 | Sung et al. .................... 349/64 |

FOREIGN PATENT DOCUMENTS

| JP | 2885693     | 2/1999 |
| JP | 2001-021869 | 1/2001 |
| JP | 2003-114433 | 4/2003 |
| JP | 2004-077955 | 3/2004 |

\* cited by examiner

*Primary Examiner*—David Nelms
*Assistant Examiner*—Jessica M Merlin
(74) *Attorney, Agent, or Firm*—Harness, Dickey & Pierce, P.L.C.

(57) ABSTRACT

An electro-optical device includes a bent wiring board that is connected to an electro-optical panel; a frame that supports the electro-optical panel; when a direction where sides of the electro-optical panel connected to the wiring board extends is set to a first direction and a direction perpendicular to the first direction is set to a second direction, first direction holding pieces which prevent positional deviation of the electro-optical panel in the first direction, the first direction holding pieces being provided at both corner portions of the frame corresponding to a bent portion of the wiring board; and second direction holding pieces which prevent positional deviation of the electro-optical panel in the second direction, the second direction holding pieces being provided at both the corner portions of the frame corresponding to the bent portion of the wiring board. Further, in at least one of both the corner portions, at least one of the first direction holding pieces and the second direction holding pieces is provided so as to be spaced apart from a vertex of the corresponding corner portion.

9 Claims, 10 Drawing Sheets

ELECTRO-OPTICAL DEVICE AND ELECTRONIC APPARATUS

BACKGROUND

1. Technical Field

The present invention relates to an electro-optical device such as a liquid crystal display device and the like, and to an electronic apparatus using the electro-optical device.

2. Related Art

In recent years, in electronic apparatuses such as a cellular phone, a portable information terminal and the like, an electro-optical device has been widely used. The electro-optical devices are used as display units to visually display various information of the electronic apparatuses. In the electro-optical devices, a device using, for example, liquid crystal as an electro-optical material, that is, a liquid crystal display device is well known.

The liquid crystal display device has a liquid crystal panel serving as an electro-optical panel. Generally, the liquid crystal panel has a structure in which a liquid crystal layer is interposed between a pair of substrates, each of which has electrodes. In the liquid crystal display device, light is supplied to the liquid crystal layer and a voltage applied to the liquid crystal layer is controlled for every pixel. As a result, alignment of liquid crystal molecules in the liquid crystal layer is controlled for every pixel. The light supplied to the liquid crystal layer is modulated according to an alignment state of the liquid crystal molecules. The modulated light is supplied to a surface of a polarizing plate toward the liquid crystal, so that images, such as characters, figures or diagrams, can be displayed on a surface of an observing side of the polarizing plate.

In order to dispose the electro-optical panel at a predetermined location of the electro-optical device, a frame is mainly used. In general, the frame has a plurality of locking pieces for preventing positional deviation of the electro-optical panel in vertical and horizontal directions, and the electro-optical panel is positioned by the locking pieces (see JP Patent No. 2885693 (page 2, FIG. 1)).

However, in the electro-optical device according to the related art, the vertical locking pieces for preventing the positional deviation of the electro-optical panel in the vertical direction, and the horizontal locking pieces for preventing the positional deviation of the electro-optical panel in the horizontal direction are provided at vertexes of corner portions of the frame. That is, the vertical locking pieces and the horizontal locking pieces are connected to each other at the vertexes of the corner portions.

However, there are many cases that a wiring board is connected to the electro-optical panel. In many cases, the wiring board is connected to an end portion of one side of the electro-optical panel. In addition, an electrical signal or power is supplied to the electro-optical panel through the wiring board. In recent years, the wiring board has not been extended linearly to the outside of the electro-optical panel, but has been bent to be disposed at a rear surface side of the electro-optical panel, that is, a rear surface side of the display surface.

In this case, there is concern that the horizontal locking pieces and the vertical locking pieces provided on the corner portions of the frame in a connected state can positionally hinder bending and disposing of the wiring board. Particularly, in a case in which electronic components, such as a resister, a coil, a capacitor, a power supply IC and the like, are mounted on the wiring board, there is a problem in that when bending the wiring board, the electric components collide against the vertical locking pieces or the horizontal locking pieces to make it difficult to bend the wiring board. Further, there is a problem in that the vertical locking pieces and the horizontal locking pieces hinder the bending process of the wiring board.

SUMMARY

An advantage of some aspects of the invention is that it provides an electro-optical device and an electronic apparatus, which is capable of easily bending a wiring board.

According to a first aspect of the invention, an electro-optical device includes: a bent wiring board that is connected to an electro-optical panel; a frame that supports the electro-optical panel, wherein a direction where a side of the electro-optical panel connected to the wiring board extends is set to a horizontal direction and a direction perpendicular to the horizontal direction is set to a vertical direction; horizontal locking pieces which prevent positional deviation of the electro-optical panel in a horizontal direction, the horizontal locking pieces being provided at both corner portions of the frame corresponding to a bent portion of the wiring board; and vertical locking pieces which prevent positional deviation of the electro-optical panel in a vertical direction, the vertical locking pieces being provided at both the corner portions of the frame corresponding to the bent portion of the wiring board. In addition, in at least one of both the corner portions, at least one of the horizontal locking pieces and the vertical locking pieces is provided so as to be spaced apart from a vertex of the corresponding corner portion.

In the configuration, the electro-optical panel is a panel structure containing an electro-optical material such as liquid crystal or the like, and performs display by using an electro-optical reaction of the electro-optical material. For example, if liquid crystal is used as the electro-optical material, a liquid crystal panel is constructed as the electro-optical panel.

Further, the 'frame' is provided with the horizontal locking pieces and the vertical locking pieces by which the electro-optical panel is maintained in a predetermined position. The frame needs to be provided with the horizontal locking pieces and the vertical locking pieces, or maintain at predetermined positions various elements subordinated to the electro-optical panel. Therefore, the frame should have a special shape. For this reason, it is preferable that the frame be formed by a forming process using resin as a material.

According to this aspect, in at least one of both the corner portions of the frame corresponding to the bent portion of the wiring board, at least one of the vertical locking pieces and the horizontal locking pieces is disposed so as to be spaced apart from the vertexes of the corner portions. Therefore, it becomes possible to obtain a large space in the vertical direction of the corner portion of the frame or the horizontal direction thereof, or in both the directions thereof. Accordingly, the process of bending the wiring board can be easily performed, so that the electro-optical device can be easily manufactured. Further, since undesired stress, which may occur when the vertical locking pieces and the horizontal locking pieces collide against the wiring board in the bent state, is not applied thereto, the generation of the defects in the wiring board can be prevented.

Preferably, in at least one of both the corner portions, the vertical locking piece is provided at the vertex of the corner portion, and the horizontal locking piece is provided so as to be spaced apart from the vertex of the corner portion. Accordingly, a large space is obtained in the horizontal direction of the electro-optical panel in the bent portion of the wiring board, so that the degree of positional freedom of the wiring board with respect to the horizontal direction can be increased.

Preferably, in at least one of both the corner portions, the horizontal locking piece is provided at the vertex of the corner portion, and the vertical locking piece is provided so as to be spaced apart from the vertex of the corner portion. Accordingly, a large space is obtained in the vertical direction of the electro-optical panel in the corner portions of the frame near the bent portion of the wiring board, so that the degree of positional freedom of the wiring board with respect to the vertical direction can be increased.

Preferably, in at least one of both the corner portions, both the horizontal locking piece and the vertical locking piece are provided so as to be spaced apart from the vertexes of the corner portions. Accordingly, a large space is obtained in the horizontal and vertical directions of the electro-optical panel in the bent portion of the wiring board, so that the degree of positional freedoms of the wiring board with respect to the horizontal and vertical directions can be increased.

Preferably, a light source is provided in a space in which the wiring board can be bent. The light source constitutes the illumination device used as, for example, a back light, and can be constructed by a point-shaped light source, such as an LED (light emitting diode) or the like, or a line-shaped light source, such as a cold cathode ray tube or the like. The light source is generally disposed at a predetermined position in the frame in a state in which it is mounted on a substrate for the light source. Since the substrate for the light source has a predetermined size, it may become difficult for the substrate for the light source to be disposed in the predetermined position. However, according to this aspect, the vertical locking pieces and the horizontal locking pieces can be formed so as to be spaced apart from the corner portions of the frame such that the position of the substrate for the light source is not hindered.

Preferably, an electronic component is provided on a bent portion of the wiring board. The electronic component is an electronic component necessary for driving the electro-optical device, such as a resister, a coil, a capacitor, a power supply IC or the like. Recently, the electro-optical device has the electronic components provided at the wiring board, particularly, at the bent portion of the wiring board in order to reduce a size.

In this case, if both the vertical locking piece and the horizontal locking piece are collectively provided at the corner portions of the frame, there is a fear that the installation position of the electronic components or the shape of the wiring board on which many electronic components are mounted may be restricted by the locking pieces. With regard to this, if one or both of the vertical locking piece and the horizontal locking piece are provided so as to be spaced apart from the corner portion of the frame, the degree of freedom of the mounting position of the electronic components in the wiring board or arranging position of the wiring board in the frame can be increased.

Preferably, an outer frame covering the electro-optical panel can be provided on a surface opposite to a display surface of the electro-optical panel. In addition, the outer frame can be constructed by a first outer frame covering the electro-optical panel corresponding to the bent portion of the wiring board, and a second outer frame covering the other portion of the electro-optical panel. In this case, it is preferable that the horizontal locking pieces provided at both the corner portions of the frame be provided so as to be spaced apart from the vertexes of the corner portions. Further, it is preferable that the first outer frame be disposed in a gap ranging from the both horizontal locking pieces to the vertexes of the corner portions.

A thickness of the bent portion of the wiring board tends to become larger than that of the other of the electro-optical panel. In a case in which the light source or the electronic components are disposed at the bent portion of the wiring board, this tendency is remarkable. In this case, if the outer frame covering the rear surface of the electro-optical panel is divided into the first outer frame and the second outer frame as described above and the bent portion of the wiring board is covered by the first outer frame, only the first frame becomes thicker and the portion covered by the second frame becomes thinner. In a case in which the first outer frame and the second outer frame are separately provided around the electro-optical panel, the horizontal locking pieces become a border between the first frame and the second frame.

According to a second aspect of the invention, an electro-optical device includes:

a bent wiring board that is connected to an electro-optical panel; a frame that supports the electro-optical panel, wherein a direction where a side of the electro-optical panel connected to the wiring board extends is set to a horizontal direction and a direction perpendicular to the horizontal direction is set to a vertical direction; horizontal locking pieces which prevent positional deviation of the electro-optical panel in a horizontal direction, the horizontal locking pieces being provided at the frame corresponding to a bent portion of the wiring board; and vertical locking pieces which prevent positional deviation of the electro-optical panel in a vertical direction, the vertical locking pieces being provided at the frame corresponding to the bent portion of the wiring board. In addition, at least one of the horizontal locking pieces and the vertical locking pieces is provided at the vertex of the corner portion, and the other is provided so as to be spaced apart from a vertex of the corner portion.

According to this aspect, since at least one of the vertical locking pieces and the horizontal locking pieces is spaced apart from the vertex of the corner portion, the large space can be obtained in the vertical direction of the corner portion of the frame or in the horizontal direction thereof or in both the directions thereof. Therefore, it becomes possible to easily perform the bending process of the wiring board, thereby manufacturing the electro-optical device with ease. Further, since undesired stress, which may occur when the vertical locking pieces and the horizontal locking pieces collide against the wiring board in the bent state, is not applied thereto, the generation of the defects in the wiring board can be prevented.

According to a third aspect of the invention, an electro-optical device includes: a bent wiring board that is connected to an electro-optical panel; a frame that supports the electro-optical panel, wherein a direction where a side of the electro-optical panel connected to the wiring board extends is set to a horizontal direction and a direction perpendicular to the horizontal direction is set to a vertical direction; horizontal locking pieces which prevent positional deviation of the electro-optical panel in a horizontal direction, the horizontal locking pieces being provided at the frame corresponding to a bent portion of the wiring board; and vertical locking pieces which prevent positional deviation of the electro-optical panel in a vertical direction, the vertical locking pieces being provided at the frame corresponding to the bent portion of the wiring board. In addition, the horizontal locking pieces and the vertical locking pieces are provided so as to be spaced apart from the vertexes of the corner portions.

According to this aspect, since both the vertical locking pieces and the horizontal locking pieces are spaced apart from the vertexes of the corner portions, the large spaces can be obtained in the vertical and horizontal directions of the corner portion of the frame. Therefore, it becomes possible to easily perform the bending process of the wiring board, thereby manufacturing the electro-optical device with ease. Further, since undesired stress, which may occur when the vertical locking pieces and the horizontal locking pieces collide against the wiring board in the bent state, is not applied thereto, the generation of the defects in the wiring board can be prevented.

Preferably, a light source and/or an electronic component is provided in a region where the vertical locking piece and/or the horizontal locking piece is spaced apart from the vertex of the corner portion. Accordingly, a sufficient space, in which the light source or the electronic component can be provided, can be obtained.

According to a fourth aspect of the invention, an electronic apparatus includes the above-mentioned electro-optical device. For example, as the electronic apparatus, a cellular phone, a portable information terminal, an IC recorder, and other electronic apparatuses can be used. According to the electro-optical device, defects can be prevented from occurring in the wiring board. Therefore, in the electronic apparatus using the electro-optical device, defects can be prevented from occurring in the wiring board.

BRIEF DESCRIPTION OF THE DRAWINGS

The invention will be described with reference to the accompanying drawings, wherein like-numbers reference like elements.

DESCRIPTION OF EXEMPLARY EMBODIMENTS

Figure 1:
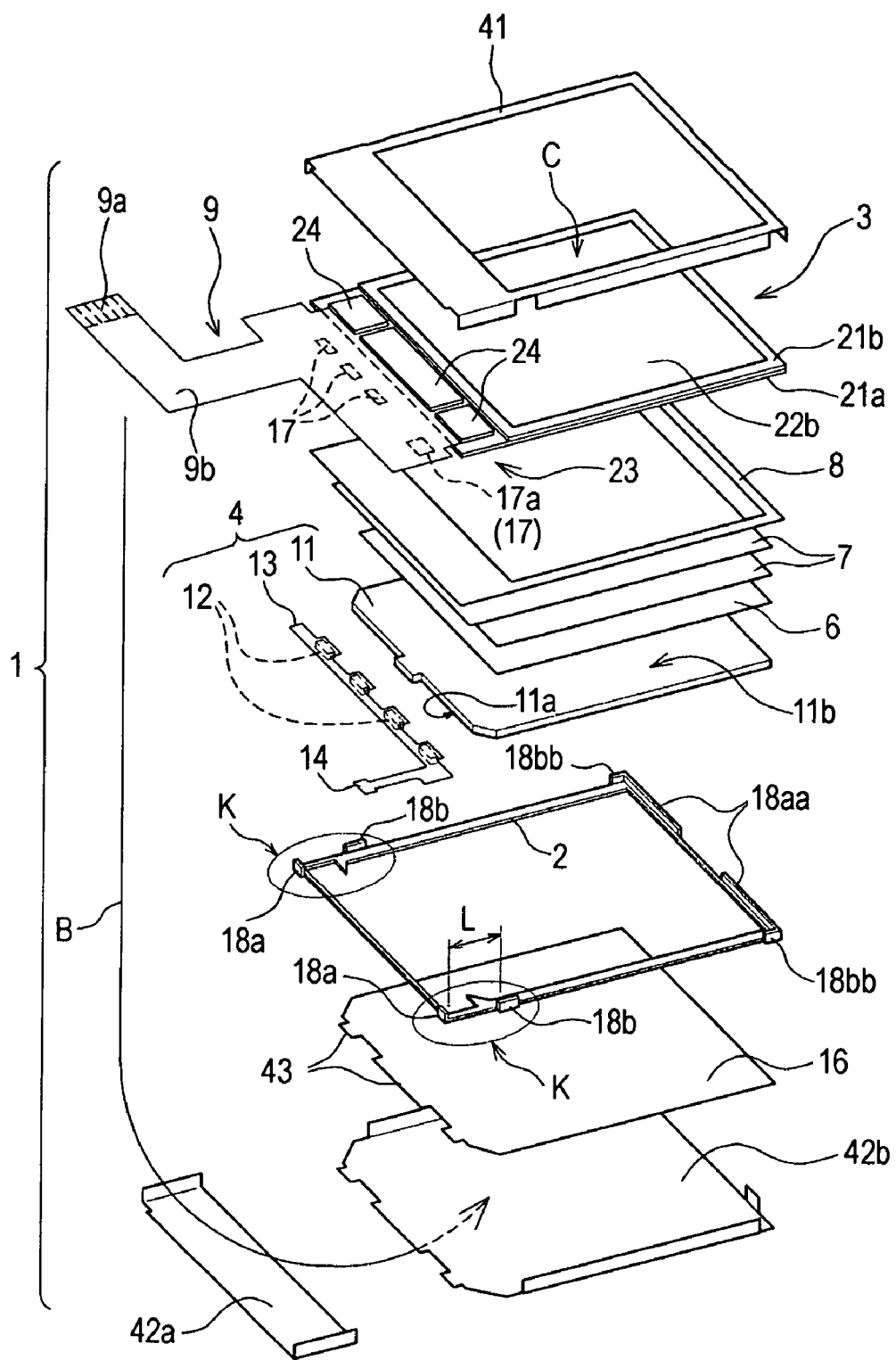
FIG. 1 is an exploded perspective view of a liquid crystal display device which is an electro-optical device according to a first embodiment of the invention.

Hereinafter, an electro-optical device according to a first embodiment of the invention will be described as an example. In addition, it should be understood that the invention is not limited to this embodiment. The scale of each layer or member has been adjusted in order to have a recognizable size in the drawings.

FIG. 1 is an exploded perspective view of a liquid crystal display device which is an example of the electro-optical device according to the invention. In FIG. 1, a liquid crystal display device 1 includes a frame 2 and a liquid crystal panel 3 serving as an electro-optical panel which is supported by the frame 2. Between the liquid crystal panel 3 and the frame 2, an illumination device 4, a light diffusion film 6, two prism sheets 7, and a double-sided adhesive sheet 8 having a frame shape are provided. Other than these optical sheets, any required sheets may be used, if necessary.

The illumination device 4 has a light guiding body 11 and LEDs 12 serving as a light source. In the present embodiment, four LEDs 12 are provided. The four LEDs 12 are mounted on an LED substrate 13 which is a flexible substrate. The LED substrate 13 has terminals 14 through which power is supplied to each of the LEDs 12. A light-emitting surface of each of the LEDs 12 is disposed so as to face a light incidence surface 11a which is one side of the light guiding body 11. Light emitted from each of the LEDs 12 is introduced into the inside of the light guiding body 11 through the light incidence surface 11a, is emitted from a light emitting surface 11b of the light guiding body 11 as plane-shaped light, and is then supplied to the liquid crystal panel 3.

The light guiding body 11 is accommodated in a space surrounded by the frame 2 without causing positional deviation. In addition, a light reflective film 16 is provided so as to come into contact with a bottom surface of the light guiding body 11, that is, a surface opposite to the light emitting surface 11b. The light reflective film 16 adheres to a bottom surface of the frame 2. On the light emitting surface 11b of the light guiding body 11, the light diffusion film 6 and the prism sheets 7 and 7 are laminated. Further, a bottom surface of the double-sided adhesive sheet 8 adheres to the frame 2, and the liquid crystal panel 3 adheres to a top surface of the double-sided adhesive sheet 8. As a result, the liquid crystal panel 3, the illumination device 4, and the plurality of optical sheets 6, 7, 8, and 16 are integrated with the frame 2 to form a panel unit.

Figure 2:
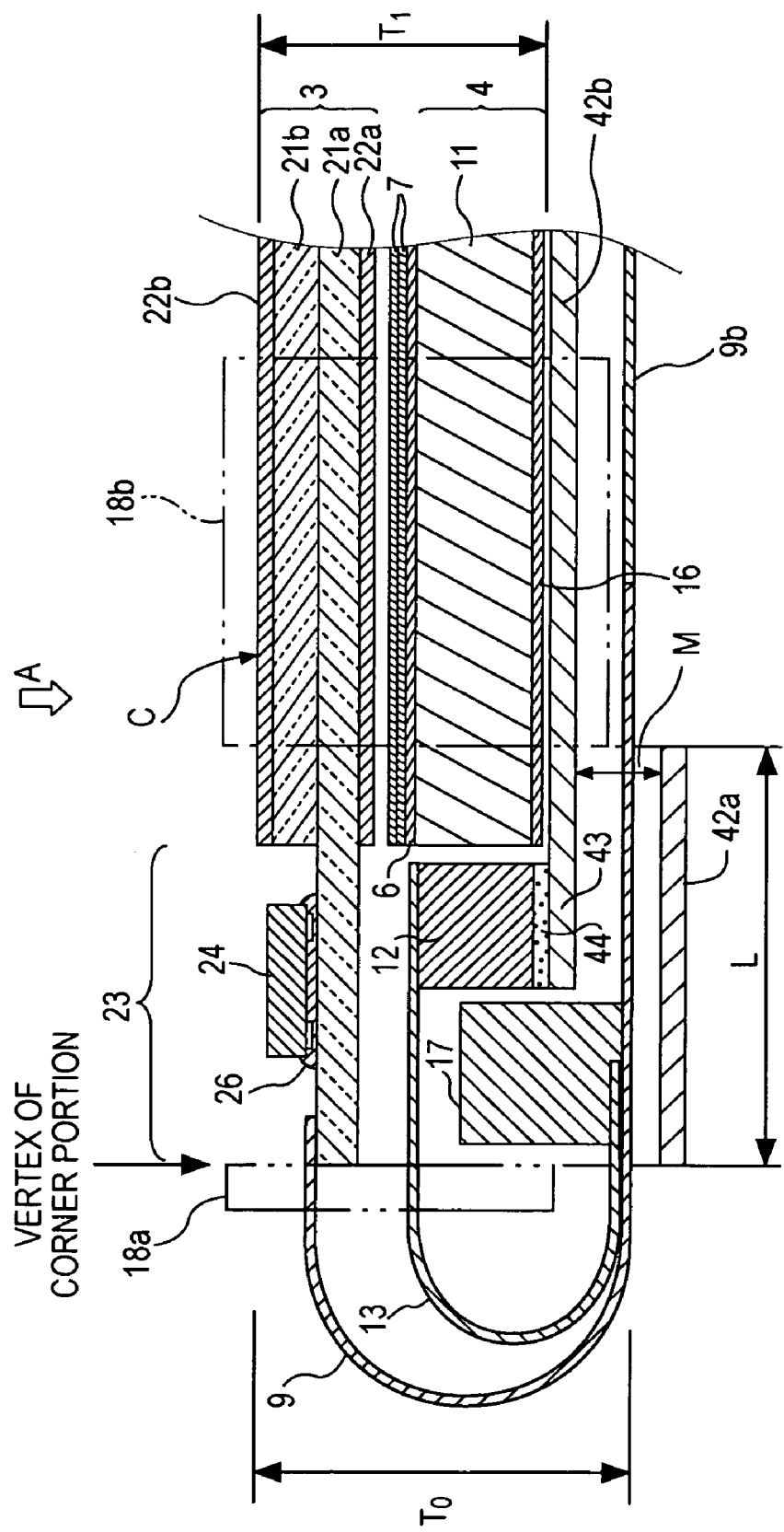
FIG. 2 is a cross-sectional view illustrating a sectional structure of essential elements of the liquid crystal display device shown in FIG. 1.

FIG. 2 is a cross-sectional view illustrating a portion of a sectional structure of the panel unit. As shown in FIG. 2, the liquid crystal panel 3 includes a first light transmitting substrate 21a, a second light transmitting substrate 21b, a polarizing plate 22a adhered on an outer surface of the first light transmitting substrate 21a, and a polarizing plate 22b adhered on an outer surface of the second light transmitting substrate 21b. The polarizing axis of the polarizing plate 22a and the polarizing axis of the polarizing plate 22b are set in a state in which they appropriately deviate from each other. Further, in addition to the polarizing plates 22a and 22b, another optical element, for example, a phase difference plate or the like may be provided. The first light transmitting substrate 21a has an extending portion 23 extending outward from the second light transmitting substrate 21b, and a driver IC 24 is mounted on the extending portion 23 using an ACF (anisotropic conductive film) 26 by means of a technology of a COG (chip on glass).

Although not shown in detail, electrodes are provided on the surface of each of the first light transmitting substrate 21a and the second light transmitting substrate 21b. Further, liquid crystal is sealed between these substrates. When the plane-shaped light is supplied to the liquid crystal panel 3 from the illumination device 4, the light passing through the liquid crystal is modulated for every pixel by controlling a voltage applied to a pair of electrodes for every pixel. In addition, the modulated light passes through the polarizing plate 22*b*, so that images, such as characters, figures, diagrams and the like, are displayed on a light emitting surface of the polarizing plate 22*b*. The direction indicated by an arrow A is a direction in which the display is observed. Further, in FIG. 1, the surface on which the polarizing plate 22*b* is provided is a display surface C.

The liquid crystal panel 3 can be constructed in any display modes. For example, as for a liquid crystal driving method, a simple matrix type or an active matrix type may be employed. Further, as for a liquid crystal mode type, TN (twisted nematic), STN (super twisted nematic), liquid crystal having negative dielectric anisotropy (that is, vertical alignment liquid crystal), and any other type of liquid crystal can be employed. Further, as for a lighting method, any one of a reflective type, a transmissive type and a transflective type can be employed.

The reflective type is a method in which external light, such as sunlight, indoor light and the like, is reflected at the inside of the liquid crystal panel 3 so as to be used in display. Further, the transmissive type is a method in which display is performed using light transmitted through the liquid crystal panel 3. Furthermore, the transflective type is a method in which both the reflective display and the transmissive display can be selectively performed. In addition, in the present embodiment, since the illumination device 4 is provided as a back light, the transmissive type or the transflective type is employed as the lighting method.

The simple matrix type is a matrix type in which an intersection of a scanning electrode and a data electrode corresponds to a pixel or a dot and a driving signal is directly applied to each pixel without providing an active element in each pixel. As a liquid crystal mode for this simple matrix type, the TN mode, the STN mode and the vertical alignment mode are used. Next, the active matrix type is a matrix type in which the active element is provided for every pixel or dot, and the active element enters in an on state during a writing period to write a data voltage therein and enters in an off state during the other periods to hold the voltage. The active element used for the active matrix type has a three terminal type and a two terminal type. For example, examples of the three terminal type of active element include a TFT (thin film transistor). Further, examples of the two terminal type of active element include a TFD (thin film diode).

In the above-mentioned liquid crystal panel 3, in a case in which color display is performed, a color filer is provided at only one substrate of the pair of substrates. The color filter is constructed by a plurality of filters transmitting selectively light within a specific wavelength range. For example, the color filter is formed by arranging the filters in a predetermined array such as, for example, a stripe array, a delta array and a mosaic array by associating the filters each corresponding to any one of three primary colors, that is, B (blue), G (green) and R (red) with the respective pixels on a substrate.

Figure 7:
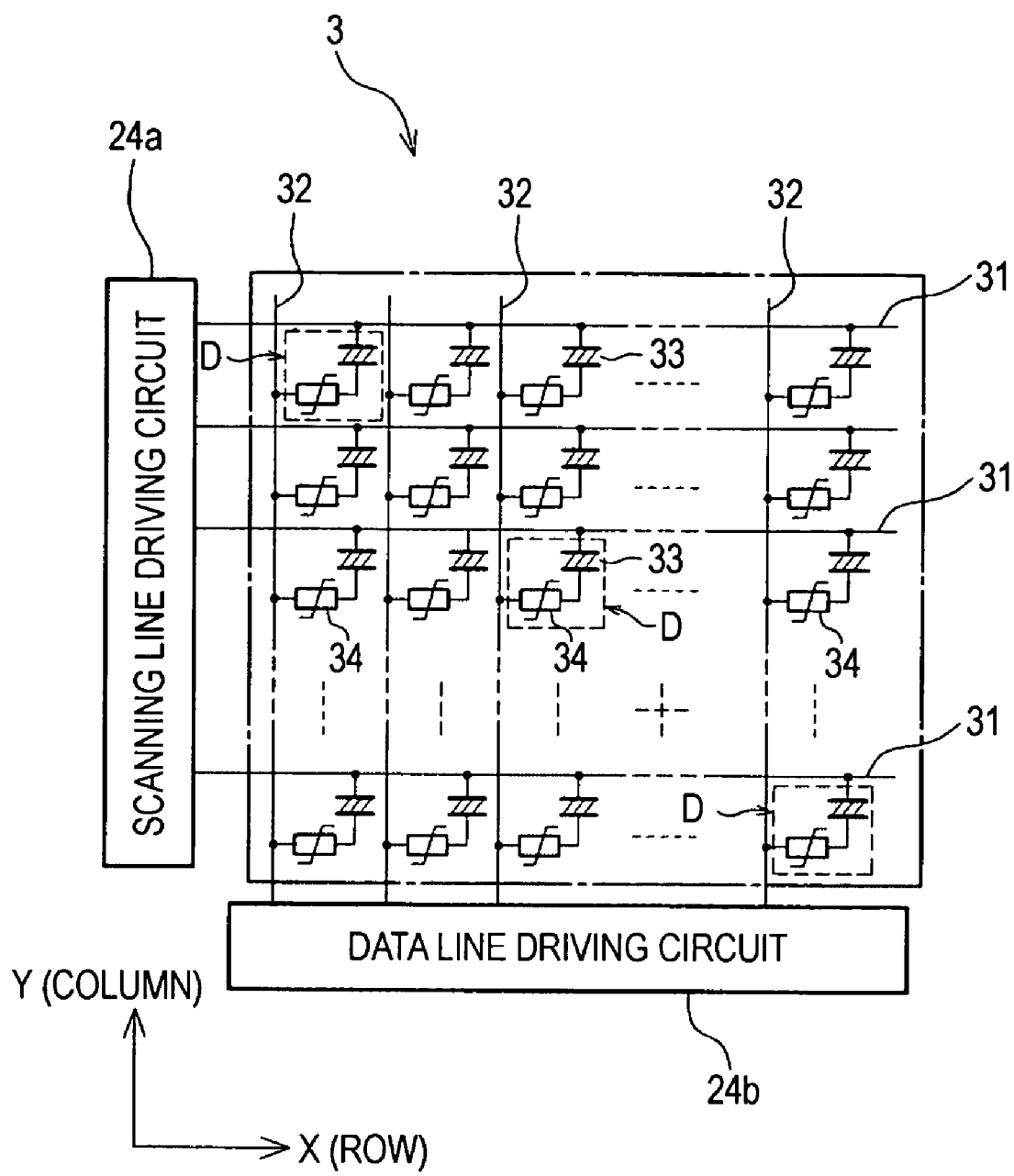
FIG. 7 is a circuit diagram illustrating an example of an electrical equivalent circuit of the liquid crystal display device of FIG. 1.

FIG. 7 shows an electrical equivalent circuit when the active-matrix-type liquid crystal panel using the TFD element is used as the liquid crystal panel 3. In FIG. 7, a plurality of scanning lines 31 are formed so as to extend in a row direction X, and a plurality of data lines 32 are formed so as to extend in a column direction Y. The scanning lines 31 are formed as stripe-shaped electrodes on one substrate of the first light transmitting substrate 21*a* and the second light transmitting substrate 21*b* (shown in FIG. 2) where the TFD element is not provided. Further, the data lines 32 are formed as linear wiring lines on one substrate of the first light transmitting substrate 21*a* and the second light transmitting substrate 21*b* where the TFD element is provided. A display dot D, which is a minimum unit of the display, is formed at an intersection of the scanning line 31 and the data line 32. In each display dot D, a liquid crystal layer 33 and the TFD element 34 are connected in series to each other.

In a case in which color display is performed by making one of the color filters of blue (B), green (G) and red (B) correspond to each display dot D, one pixel is formed by the display dots D of the three colors. In contrast, in a case in which mono color display is performed by black, white and the like, one display dot D forms one pixel.

In FIG. 7, the liquid crystal layer 33 is connected to the scanning line 31 and the TFD element 34 is connected to the data line 32, but the connection relationship may be changed. Each of the scanning lines 31 is driven by a scanning line driving circuit 24*a*, and each of the data lines 32 is driven by a data line driving circuit 24*b*. The scanning line driving circuit 24*a* and the data line driving circuit 24*b* are constructed by the driver IC 24 shown in FIG. 2. The driver IC 24 can constitute a common IC serving as the scanning line driving circuit 24*a* and the data line driving circuit 24*b*, and can constitute an individual IC serving as the scanning line driving circuit 24*a* and an individual IC serving as the data line driving circuit 24*b*.

Figure 8:
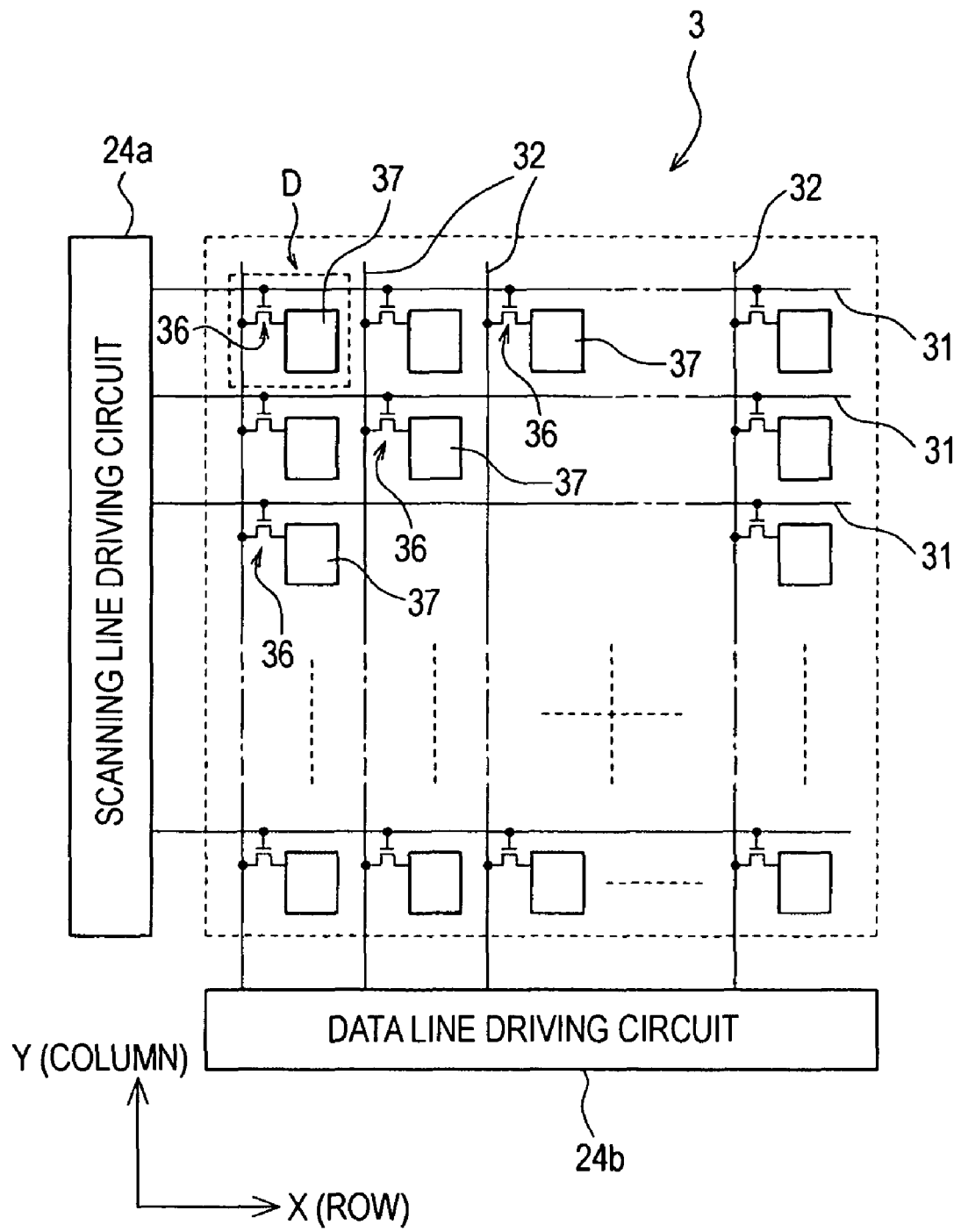
FIG. 8 is a circuit diagram illustrating another example of an electrical equivalent circuit of the liquid crystal display device of FIG. 1.

FIG. 8 shows an electrical equivalent circuit when the active-matrix-type liquid crystal panel using the TFT element is used as the liquid crystal panel 3. In FIG. 8, a plurality of scanning lines 31 are formed so as to extend in a row direction X, and a plurality of data lines 32 are formed so as to extend in a column direction Y. The scanning lines 31 are formed as lines connected to gate electrodes of the TFT elements formed on one substrate of the first light transmitting substrate 21*a* and the second light transmitting substrate 21*b* shown in FIG. 2, and the data lines 32 are formed as lines connected to source electrodes of the TFT elements. A plane-shaped common electrode is formed on one substrate of the first light transmitting substrate 21*a* and the second light transmitting substrate 21*b* where the TFD element is not provided.

The display dot D is formed at an intersection of the scanning line 31 and the data line 32. In each of the display dots D, a TFT element 36 and a dot electrode 37 are connected in series to each other. Each of the scanning lines 31 is driven by the scanning line driving circuit 24*a*. Meanwhile, each of the data lines 32 is driven by the data line driving circuit 24*b*. The scanning line driving circuit 24*a* and the data line driving circuit 24*b* are constructed by the driver IC 24 shown in FIG. 2.

A scanning signal is transmitted to a gate of the TFT element 36, and a data signal is transmitted to a source of the TFT element 36. If the TFT element 36 is turned on, power is supplied to the corresponding dot electrode 37, so that writing is performed in the liquid crystal in the corresponding display dot D. Further, if the TFT element 36 is turned off, the written state is held. Through this writing and holding operation, liquid crystal molecules are controlled between the TN structure and the vertical alignment.

Referring back to FIG. 1, a wiring board 9 is connected to an edge of the extending portion 23 of the first light transmitting substrate 21*a* using the ACF, heat sealing, or any other appropriate electrical connection methods. The wiring board 9, which is formed of flexible plastic, is bent as shown by an arrow B to be disposed opposite to the display surface C of the liquid crystal panel 3 when the liquid crystal display device 1 is assembled. On a rear surface near an end portion of the wiring board 9 connected to the first light transmitting substrate 21*a*, that is, the surface of the wiring board 9 bent to become curve-shaped and facing the liquid crystal panel 3, a plurality of electronic components 17 are mounted in a line substantially parallel to the edge of the first light transmitting substrate 21a. The electronic components 17 may be, for example, a resister, a coil, a capacitor, a power supply IC and the like. In general, the power supply IC is larger than the other components in size. As shown by a reference numeral 17a, the power supply IC is mounted on the end portion of the wiring board 9.

In FIG. 1, when assembling the liquid crystal display device 1, first, the terminals 14 of the LED substrate 13 are connected to predetermined positions of the wiring board 9 by means of soldering or other electrical connection method. Next, the light reflective film 16 is adhered on the bottom surface of the frame 2, and the light guiding body 11 is accommodated in the frame 2 so as to come into contact with the top surface of the light reflective film 16. Next, on the light guiding body 11, the light diffusion film 6 and the prism sheets 7 and 7 are mounted, and the double-sided adhesive sheet 8 is then adhered thereon. Next, the liquid crystal panel 3 is adhered on the top surface of the double-sided adhesive sheet 8, the LED substrate 13 is disposed at a position facing the light incidence surface 11a of the light guiding body 11, and each of the LEDs 12 is disposed at a predetermined position facing the light incidence surface 11a.

Figure 4:
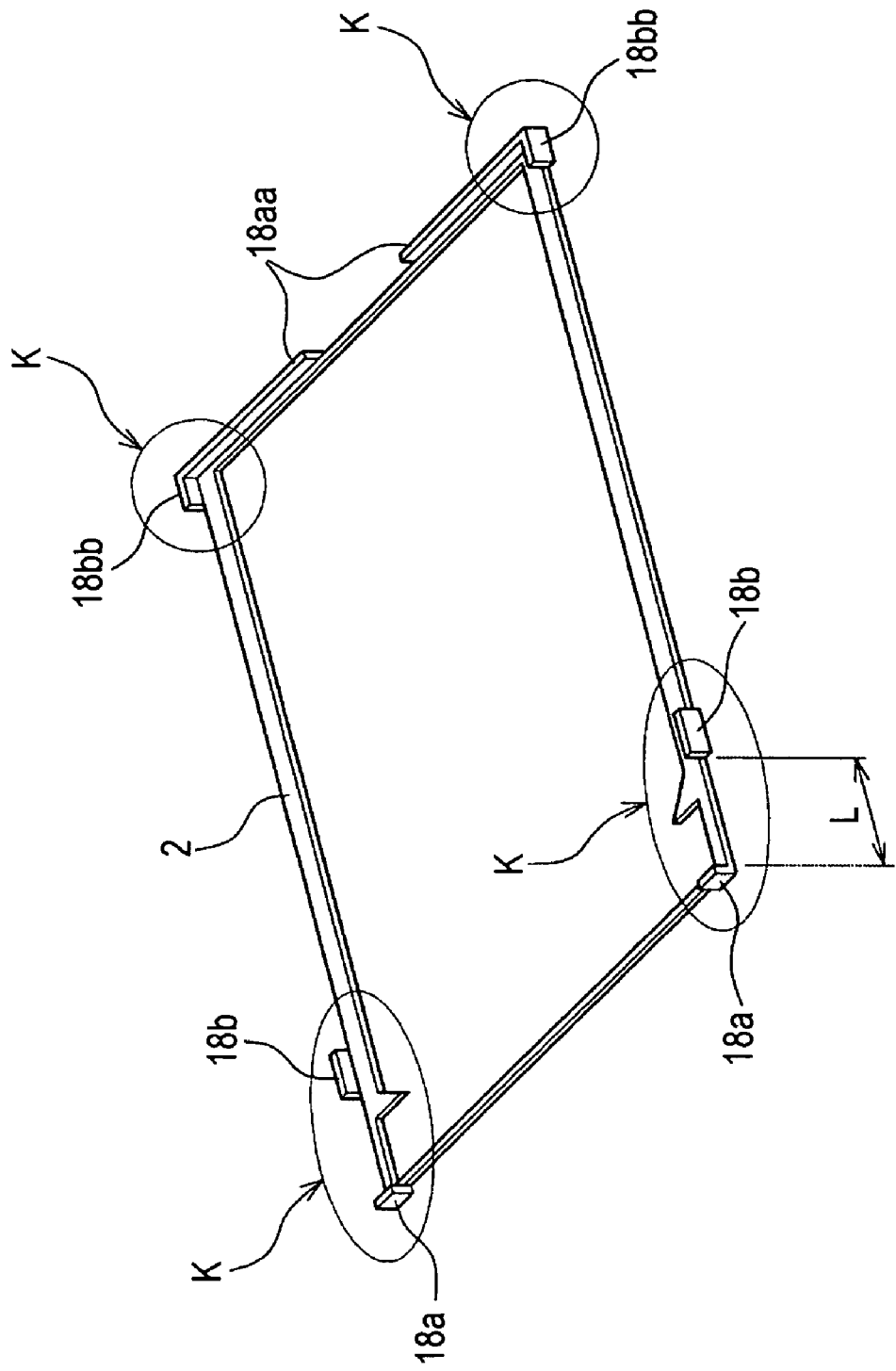
FIG. 4 is a magnified view of the essential elements of FIG. 3.

As shown in FIG. 4, the frame 2 is formed such that there is no end portion. Further, at vertexes of corner portions K of the frame 2 corresponding to bent portions of the wiring board 9, vertical locking pieces 18a are provided. In addition, horizontal locking pieces 18b are provided at positions spaced apart from the vertexes by a gap L. Further, at sides of the frame 2 opposite to the bent portions of the wiring board 9, vertical locking pieces 18aa and horizontal locking pieces 18bb, which are connected to each other at the vertexes of the corner portions K, are provided. The vertical locking pieces 18a and 18aa are locking pieces for preventing positional deviation of the liquid crystal panel 3 shown in FIG. 1 in a vertical direction, that is, positional deviation of the liquid crystal panel 3 in a direction perpendicular to an end side of the extending portion 23 of the first light transmitting substrate 21a. Further, the horizontal locking pieces 18b and 18bb are locking pieces for preventing positional deviation of the liquid crystal panel 3 in a horizontal direction, that is, positional deviation of the liquid crystal panel 3 in a direction parallel to the end side of the extending portion 23.

In FIG. 1, when the liquid crystal panel 3 is adhered on the top surface of the double-sided adhesive sheet 8, the positional deviation of the liquid crystal panel 3 in the vertical direction is prevented by the vertical locking pieces 18a and 18aa, and the positional deviation of the liquid crystal panel 3 in the horizontal direction is prevented by the horizontal locking pieces 18b and 18bb. As a result, the liquid crystal panel 3 can be always accommodated at a predetermined position in the frame 2. In FIG. 2, a positional relationship of the vertical locking piece 18a and the horizontal locking piece 18b with respect to the liquid crystal panel 3 is shown by a two-dot chain line. As can be apprehended from FIG. 2, since a large gap L can exist between the horizontal locking piece 18b and the vertex of the corner portion of the frame 2, a large space is generated in a horizontal direction around the LED 12, the LED substrate 13, the electronic components 17, a portion of the wiring board 9 on which the electronic components 17 are mounted, and the like. Therefore, a process of disposing the LED substrate 13 at a predetermined position or a process of bending the wiring board 9 and disposing the wiring board 9 at a predetermined position can be easily performed. Further, the LED substrate 13 or the wiring board 9, which is disposed at the predetermined position, is prevented from colliding against the horizontal locking piece 18b. Therefore, abnormal stress is not applied to the LED substrate 13 and the wiring board 9, thereby preventing defects of the substrates. Further, since it becomes possible to dispose the LEDs 12 or the electronic components 17 up to a position of a horizontal end portion of the frame 2, it is possible to select the arranging position of the LEDs 12 or the electronic components 17 within a wider range.

Referring to FIG. 1, after the liquid crystal panel 3 is installed in the frame 2, a display side outer frame 41 is fitted to side surfaces of the frame 2 from the top of the liquid crystal panel 3. The display side outer frame 41 is formed of, for example, stainless steel (for example, SUS304 and SUS301) or the like. Next, a second rear surface side outer frame 42b is fitted to outer sides of side surfaces of the display side outer frame 41 from the bottom of the light reflective film 16. The second rear surface side outer frame 42b is formed of a material with high hardness and high thermal conductivity, such as stainless steel (SUS304), phosphor bronze, beryllium copper, aluminum alloy (A5052) or the like.

Figure 3:
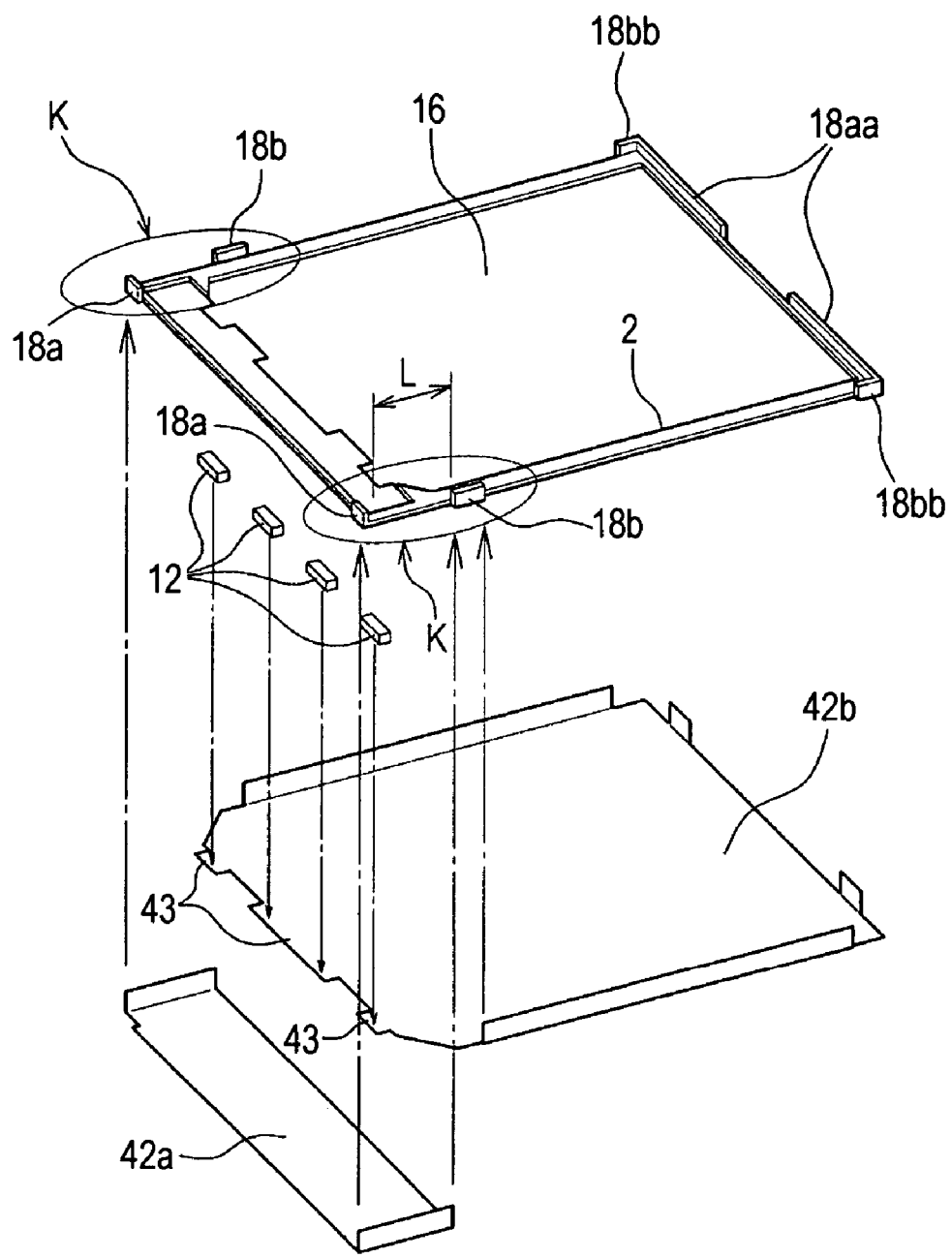
FIG. 3 is a magnified view of the essential elements of FIG. 1.

As shown in FIG. 3, the second rear surface side outer frame 42b has a plurality of protruding portions 43 (three protruding portions in the present embodiment) formed at a side end on which the LEDs 12 are disposed. As described above, when the second rear surface side outer frame 42b is fitted to the outer sides of the side surfaces of the display side outer frame 41, the protruding portions 43 are brought into contact with the LEDs 12. Further, it is preferable that the protruding portions 43 and the LEDs 12 coming into contact with each other be bonded to each other by an adhesive with high thermal conductivity, such as silicone grease 44, as shown in FIG. 2.

Next, referring to FIG. 1, the wiring board 9 is bent as shown by an arrow B, and a wiring line portion 9b thereof is disposed on the outer surface of the second rear surface side outer frame 42b. At this time, the electronic components 17 mounted on the wiring board 9 are disposed on or near the curve-shaped portion of the wiring board 9, as shown in FIG. 2. If the electronic components 17 are disposed at positions other than the curve-shaped portion of the wiring board 9, the thickness of the liquid crystal display device 1 increases as much as the thickness of the electronic components 17. However, if the electronic components 17 are accommodated in the curved-shaped portion of the wiring board 9 as in the present embodiment, it is possible to reduce the thickness of the liquid crystal display device 1.

Figure 6:
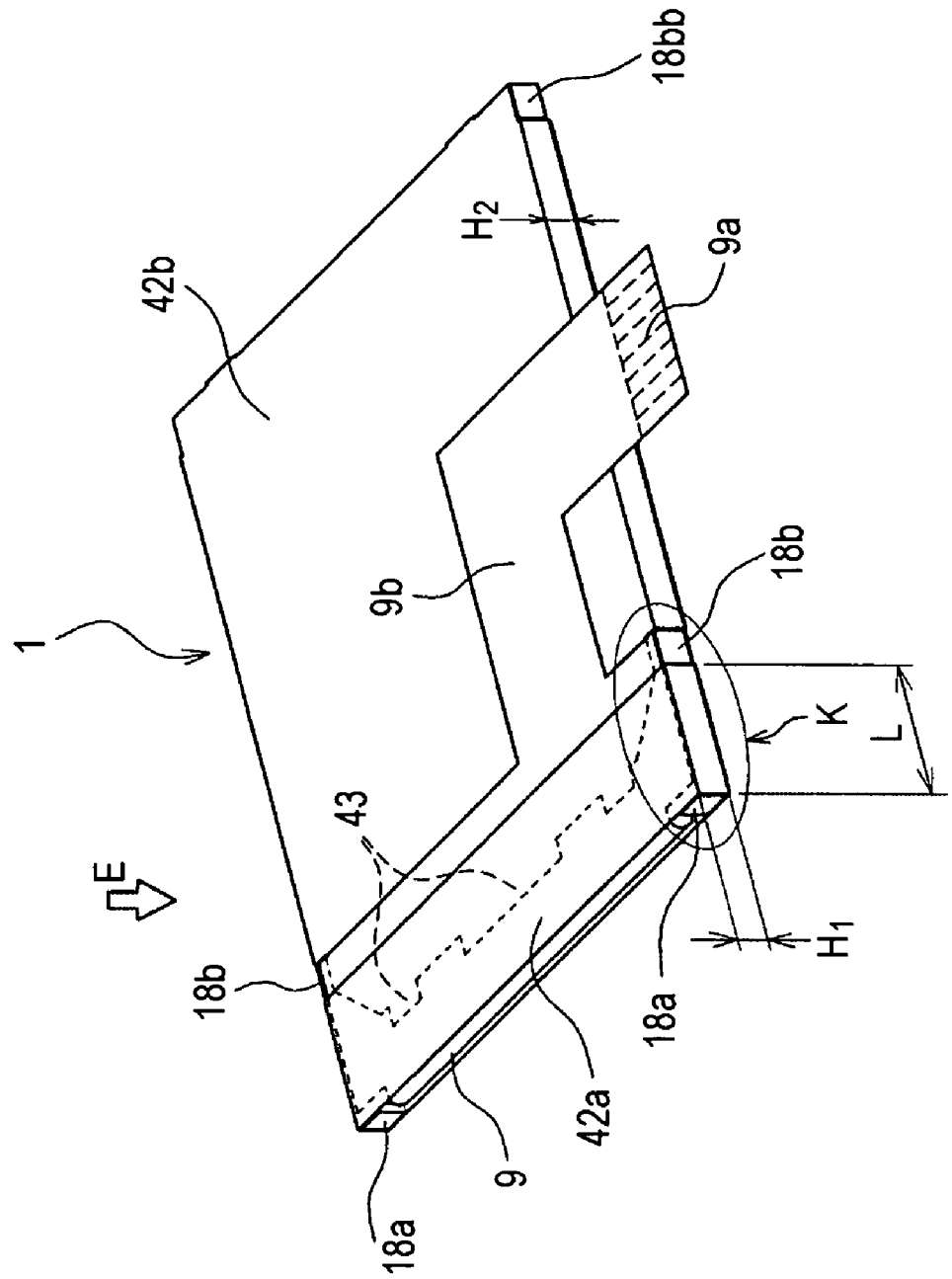
FIG. 6 is a perspective view of the external appearance of the liquid crystal display device of FIG. 1 when viewed from a rear surface side.

Next, referring to FIG. 1, the first rear surface side outer frame 42a is mounted in the gap L ranging from the horizontal locking pieces 18b and 18b to the vertexes of the corner portions. K, as shown in FIG. 6. Thereby, the liquid crystal display device 1 is completed. Similarly to the second rear surface side outer frame 42b, the first rear surface side outer frame 42a is formed of a material with high hardness and high thermal conductivity, such as stainless steel (SUS304), phosphor bronze, beryllium copper, aluminum alloy (A5052) or the like. The first rear surface side outer frame 42a is formed so as to be smaller than the second rear surface side outer frame 42b, and covers the curve-shaped portion of the wiring board 9 and a front end of the second rear surface side outer frame 42b, that is, the portion where the protruding portions 43 are formed. In other words, when viewed in a direction of an arrow E, the front ends of the first rear surface side outer frame 42a and the second rear surface side outer frame 42b overlap each other.

Further, a height H1 of the side surface of the first rear surface side outer frame 42a is larger than a height H2 of the side surface of the second rear surface side outer frame 42b.

Therefore, as shown in FIG. 6, if the first rear surface side outer frame 42a and the second rear surface side outer frame 42b are installed at predetermined positions of the frame 2 (see FIG. 1), a gap M is generated between the first rear surface side outer frame 42a and the second rear surface side outer frame 42b, as shown in FIG. 2. The wiring board 9 extends along the outer surface of the second rear surface side outer frame 42b through the gap M. In addition, as shown in FIG. 6, the wiring board 9 extends along the surface of the second rear surface side outer frame 42b, and then its terminal portion 9a extends to a side portion of the second rear surface side outer frame 42b.

Figure 5:
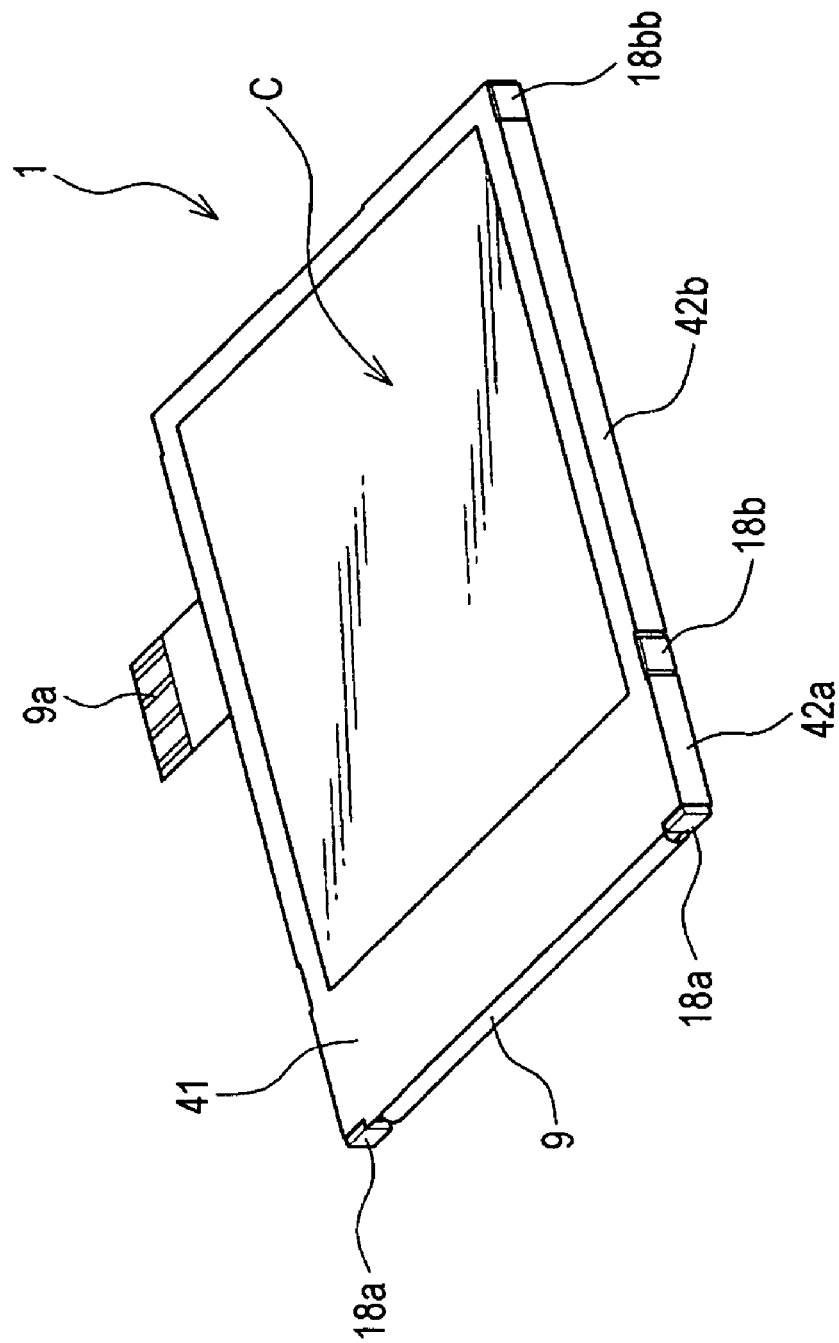
FIG. 5 is a perspective view of the external appearance of the liquid crystal display device of FIG. 1 when viewed from a display surface side.

FIG. 5 shows the liquid crystal display device 1 completed as described above when viewed from the display surface side. In FIG. 5, the terminal portion 9a of the wiring board 9 protrudes to the side portion of the display side outer frame 41. The protruding position of the terminal portion 9a of the wiring board 9 can be freely determined according to the need from the electronic apparatus in which the liquid crystal display device 1 is installed.

In the present embodiment, as shown in FIG. 1, the horizontal locking pieces 18b and 18b are disposed so as to be spaced apart from the vertexes of the corner portions K and K of the frame 2 corresponding to the bent portion of the wiring board 9 by the gap L. Therefore, the large space can be obtained in a horizontal direction of the corner portions K and K of the frame 2, that is, in a direction where the side end of the extending portion 23 of a first light transmitting substrate 21a in the liquid crystal panel 3 extends. Accordingly, the process of bending the wiring board 9 can be very easily performed, so that the liquid crystal display device 1 can be easily manufactured. Further, since undesired stress, which may occur when the horizontal locking pieces 18b and 18b collide against the bent wiring board 9 or the LED substrate 13 connected to the wiring board 9, is not applied thereto, the generation of the defects in the wiring board 9 and the LED substrate 13 can be prevented.

Further, in the present embodiment, in FIG. 2, a thickness T0 of the bent portion of the wiring board 9 tends to be larger than a thickness T1 of the liquid crystal panel 3. Particularly in the present embodiment, since the LEDs 12 and the electronic components 17 are disposed in this portion, this tendency is more remarkable. With regard to this tendency, in the present embodiment, an outer frame covering the rear surface of the liquid crystal panel 3 is divided into the first rear surface side outer frame 42a and the second rear surface side outer frame 42b, and the bent portion of the wiring board 9 is covered by the first rear surface side outer frame 42a. For this reason, only the portion of the first rear surface side outer frame 42a has a large thickness, and the thickness of the portion covered by the second rear surface side outer frame 42b is small. Since the second rear surface side outer frame 42b has a larger area than the first rear surface side outer frame 42a, almost all the portions of the liquid crystal display device 1 can have a small thickness. Thereby, the thickness and size of the electronic apparatus in which the liquid crystal display device 1 is installed can be decreased.

Further, in the present embodiment, as shown in FIGS. 2 and 3, the protruding portion 43 of the second rear surface side outer frame 42b is brought into contact with the LED 12 directly or through a thermal conductive member such as the silicone grease or the like according to the necessity, and the second rear surface side outer frame 42b is formed of a material with high thermal conductivity. Therefore, heat generated from the LED 12 is propagated by the second rear surface side outer frame 42b, so that a temperature around the LED 12 can be cooled down. As for the display using the liquid crystal, it is known that a display quality of a high temperature portion is different from that of a low temperature portion. For example, the display in the high temperature portion tends to be darkened. With regard to this tendency, if the heat generated from the LED 12 is propagated by the second rear surface side outer frame 42b as in the present embodiment, the display irregularities due to the temperature difference in the display surface of the liquid crystal panel 3 can be suppressed.

Other Embodiment of the Electro-Optical Device

While the invention has been described with respect to the preferred embodiments, it will be understood that the invention is not limited to the embodiments and various changes and modifications may be made without departing from the scope of the invention as defined in the claims.

For example, although the horizontal locking pieces 18b and 18b are provided at both of the corner portions K of one side of the frame 2 so as to be spaced apart from the vertexes of the corner portions by the gap L, as shown in FIG. 4 in the embodiment described above, the horizontal locking piece 18b may instead be provided at one of the two corner portions K so as to be spaced apart from the vertex of the corner portion by the gap L.

Further, the horizontal locking pieces 18b are provided so as to be spaced apart from the vertexes of the corner portions by the gap L in the embodiment described above. However, both or one of the two vertical locking pieces 18a and 18a may be provided so as to be spaced apart from the vertexes of the corner portions K by the gap L. If the vertical locking piece 18a is provided so as to be spaced apart from the vertex of the corner portion K by the gap L, a large space is generated in a vertical direction between the corner portion K of the frame 2 and the vertical locking piece 18a. Therefore, when the electronic components are mounted on the wiring board 9 along the vertical direction, the electronic components can be disposed with a space at regions where the corner portions K of the frame 2 are formed.

Further, although the liquid crystal panel is used as the electro-optical panel in the embodiment described above, an organic EL (electro luminescence) device, a plasma display device, and any other flat display device can be employed.

Embodiment of Electronic Apparatus

Hereinafter, embodiments of the electronic apparatus according to the invention will be described with reference to the drawings.

Figure 9:
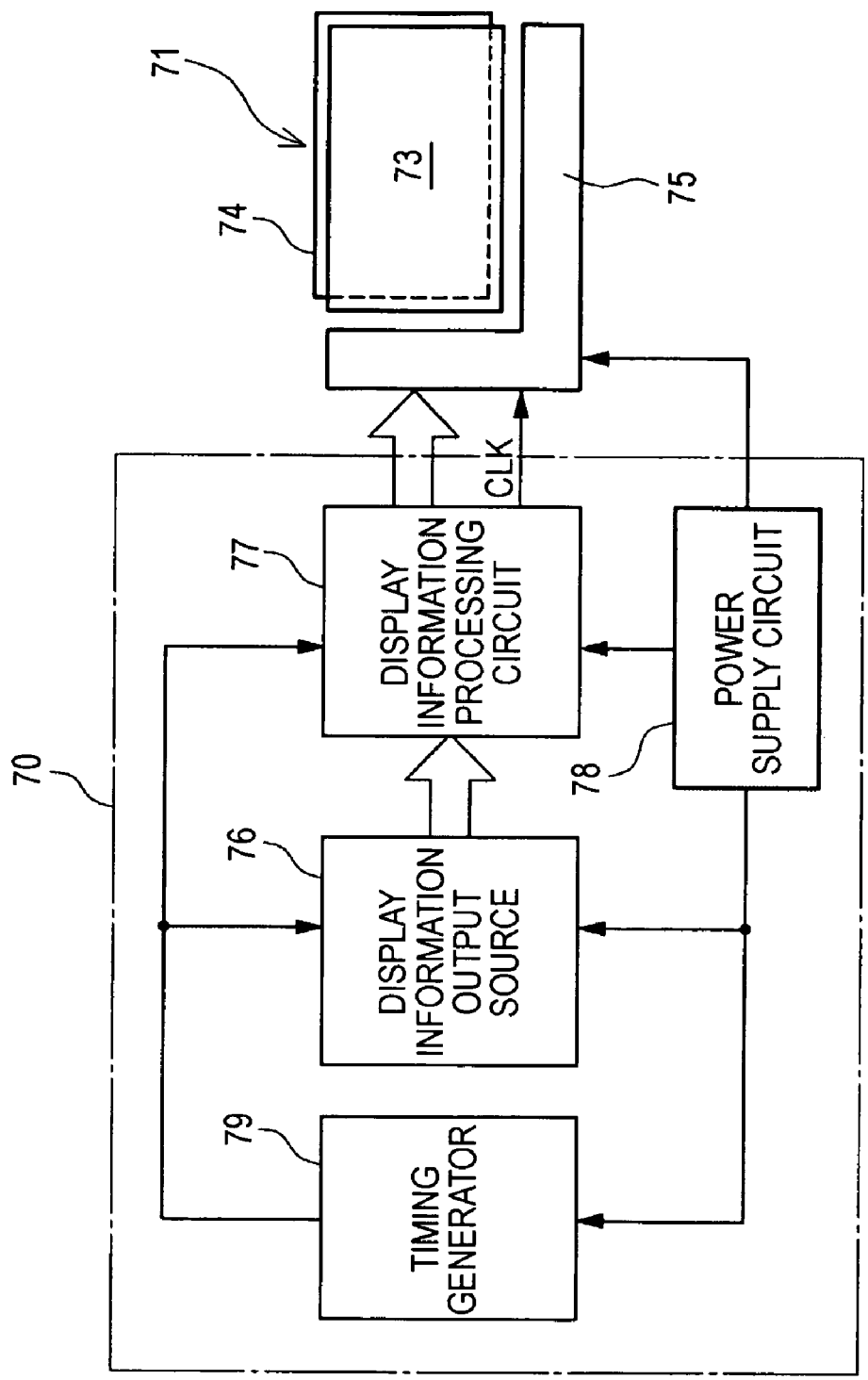
FIG. 9 is a block diagram illustrating an embodiment of an electronic apparatus according to the invention.

FIG. 9 is a block diagram of the electronic apparatus according to a first embodiment of the invention. The electronic apparatus shown in the drawing includes a liquid crystal display device 71 and a control circuit 70 for controlling the liquid crystal display device 71. The liquid crystal display device 71 has a liquid crystal panel 73, an illumination device 74, and a driving circuit 75 constructed by a semiconductor IC and the like. Further, the control circuit 70 has a display information output source 76, a display information processing circuit 77, a power supply circuit 78, and a timing generator 79.

The display information output source 76 is provided with a memory composed of a ROM (read only memory) or a RAM (random access memory), a storage unit composed of a magnetic recording disk or an optical recording disk or the like, and a tuning circuit for tuning a digital image signal to output it. The display information output source 76 supplies the display information processing circuit 77 with display information in the form of image signals of a predetermined format or the like based on various clock signals generated by the timing generator 79.

The display information processing circuit 77 is provided with a variety of well known circuits, such as a serial-to-parallel converting circuit, an amplifying/inverting circuit, a rotation circuit, a gamma correction circuit, and a clamping circuit, and processes the input display information to supply the driving circuit 75 with the image information together with the clock signal CLK. The driving circuit 75 includes a scanning line driving circuit, a data line driving circuit and an inspection circuit. Further, the power supply circuit 78 supplies a predetermined voltage to the essential elements.

The liquid crystal display device 71 can be constructed by, for example, the liquid crystal display device 1 shown in FIG. 1. The liquid crystal display device 1 shown in FIG. 1 has a structure in which the wiring board 9 does not defect in the curve-shaped portion. Further, the liquid crystal display device 1 is formed to be very thin; except for the portion corresponding to the curve-shaped portion of the wiring board 9. Therefore, the electronic apparatus using the liquid crystal display device 1 can have a stable performance in the wiring board 9 of the liquid crystal display device 1, and its portion assembled with the liquid crystal display device 1 can be formed thinly.

Figure 10:
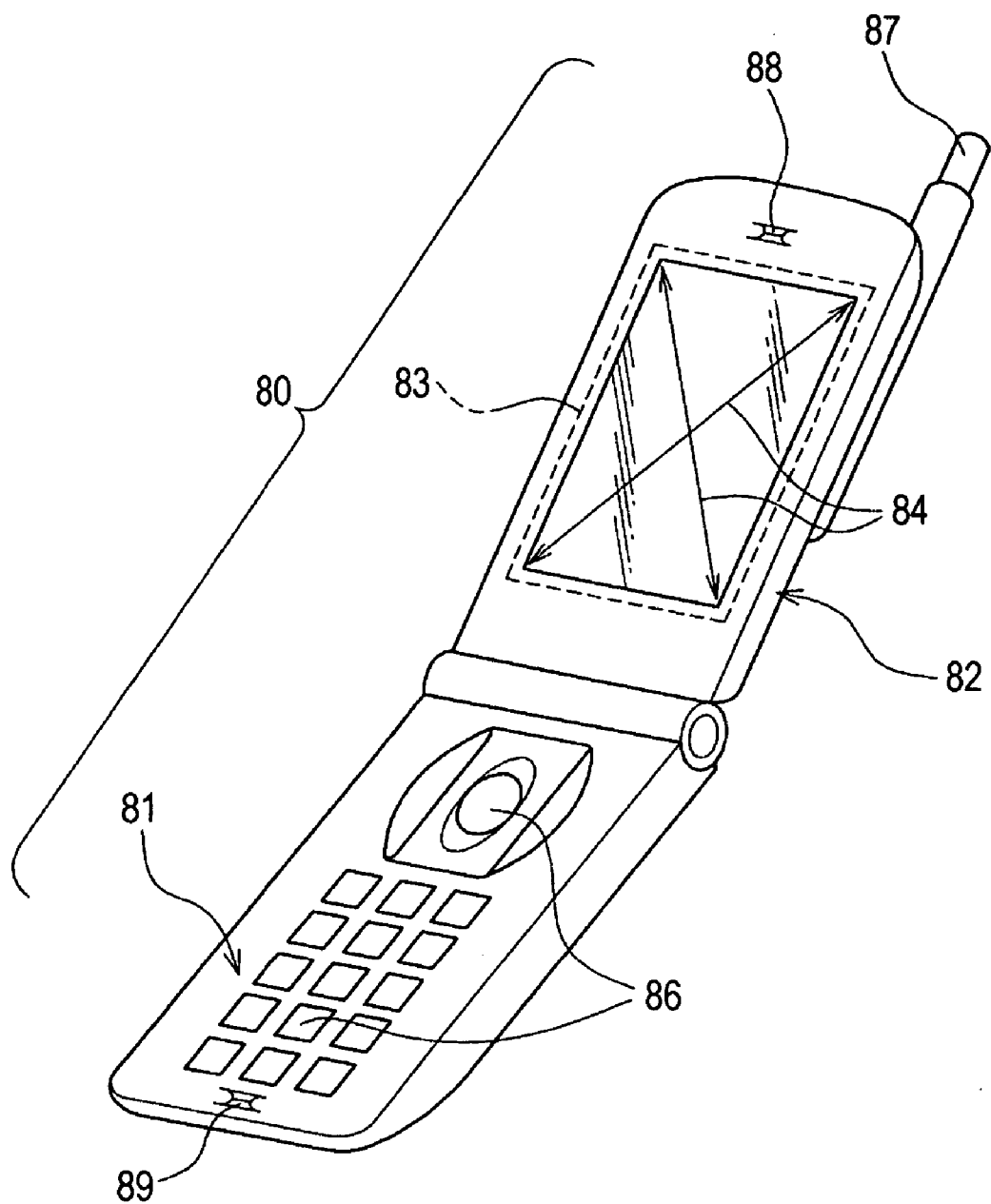
FIG. 10 is a perspective view illustrating another embodiment of an electronic apparatus according to the invention.

Next, FIG. 10 illustrates a case in which the invention is applied to a cellular phone as an example of the electronic apparatus. A cellular phone 80 shown in the drawing includes a main body 81, and a display unit 82 provided at the main body so as to be opened and closed. A display device 83, which is constructed by an electro-optical device such as a liquid crystal display device, is disposed in the inside of the display unit 82. Various display information related to communication can be viewed by a display screen 84 of the display unit 82. In the main body 81, operating buttons 86 are arranged.

An extendable and contractible antenna 87 is attached to one end portion of the display unit 82. In the inside of an earpiece 88 provided on the display unit 82, a speaker (not shown) is disposed. Further, in the inside of a mouthpiece 89 provided at a lower end portion of the main body 81, a microphone (not shown) is internally installed. The controlling unit for controlling the operation of the display device 83 is stored in the inside of the display unit 82 or the main body 81 as a part of a controlling unit in charge of an entire control of the cellular phone or separately from the controlling unit.

The display device 83 can be constructed by the liquid crystal display device 1 shown in FIG. 1. The liquid crystal display device 1 shown in FIG. 1 has a structure in which the wiring board 9 does not have defects in the curve-shaped portion. Further, the liquid crystal display device 1 is formed to be very thin, except for the portion corresponding to the curve-shaped portion of the wiring board 9. Therefore, the cellular phone 80 using the liquid crystal display device 1 can have a stable performance in the wiring board of the display device 83, and its portion assembled with the display device 83 can be formed thinly.

Modifications

Examples of the electronic apparatus according to the invention may include, in addition to the cellular phone described above, a personal computer, a liquid crystal television, a digital still camera, a wrist watch, a view-finder-type or monitor-direct-view-type video tape recorder, a car navigation device, a pager, an electronic note, an electronic calculator, a word processor, a work station, a video phone, a POS terminal, or the like.

What is claimed is:

1. An electro-optical device comprising:
an electro-optical panel having a display surface opposite a rear face and defining a major plane, the electro-optical panel having a pair of first sides extending in a first direction and a pair of second sides extending in a second direction, the first direction and the second direction being perpendicular to each other in the major plane;
a bent wiring board connected to one of the pair of first sides of the electro-optical panel and extending in the second direction, the bent wiring board having a single bent portion extending between a first edge and a second edge of the bent wiring board;
a display side outer frame having a body adjacent the display surface and extending parallel to the major plane of the electro-optical panel, and a pair of turndown flanges adjacent the pair of second sides and extending in a third direction normal to the major plane, the display side outer frame including a first pair of notches formed in the body and the pair of turndown flanges and a second pair of notches formed in the body between the pair of turndown flanges, the first and second pairs of notches defining corresponding openings in the body in the third direction;
a support frame adjacent the rear face and extending parallel to the major plane of the electro-optical panel that supports the electro-optical panel in the major plane, the support frame including a pair of first side members and a second side member that form corner portions of the support frame corresponding to the bent portion of the wiring board, the corner portions having a first side and second sides that are connected to the first side at vertexes of the corner portions;
a pair of first direction holding tabs protruding from the pair of first side members in the third direction that prevent positional deviation of the electro-optical panel in the first direction, one of the pair of first direction holding tabs being provided at each of opposing corner portions of the support frame that correspond to the bent portion of the wiring board, the pair of first direction holding tabs sandwiching the first and second edges of the bent portion of the wiring board therebetween in the first direction, the pair of first direction holding tabs fitting into the openings defined by the first pair of notches in the body and the pair of turndown flanges of the display side outer frame; and
a pair of second direction holding tabs protruding from the second side member in the third direction that prevent positional deviation of the electro-optical panel in the second direction, the pair of second direction holding tabs being provided at each of the opposing corner portions of the support frame that correspond to the bent portion of the wiring board, the pair of second direction holding tabs sandwiching the first and second edges of the bent portion of the wiring board therebetween in the first direction, wherein at least one of the first direction holding tabs and the second direction holding tabs is provided at a position separated from the vertex of the corresponding corner portion, the pair of second direction holding tabs fitting into the openings defined by the second pair of notches in the body of display side outer frame.

2. The electro-optical device according to claim 1, wherein the pair of second direction holding tabs is provided at the vertexes of the corner portions and the pair of first direction holding tabs is provided at a position separated from the vertexes of the corner portions.

3. The electro-optical device according to claim 1, wherein the pair of first direction holding tabs is provided at the vertexes of the corner portions and the pair of second direction holding tabs is provided at a position separated from the vertexes of the corner portions.

4. The electro-optical device according to claim 1, wherein both the pair of first direction holding tabs and the pair of second direction holding tabs are provided at a position separated from the vertexes of the corner portions.

5. The electro-optical device according to claim 1, further comprising a light source provided in a space in which the wiring board is bent.

6. The electro-optical device according to claim 1, further comprising an electronic component provided on the bent portion of the wiring board.

7. The electro-optical device according to claim 1, further comprising:
   a rear side outer frame that covers a surface of the electro-optical panel opposite to the display surface,
   wherein the rear side outer frame has a first outer frame to cover a portion of the electro-optical panel corresponding to the bent portion of the wiring board and a second outer frame to cover the other portion of the electro-optical panel,
   in both the corner portions of the support frame, the pair of first direction holding tabs is provided at a position separated from the vertexes of the corner portions, and
   the first outer frame is provided in a gap ranging from the pair of first direction holding tabs to the vertexes of the corner portions.

8. The electro-optical device according to claim 1, wherein a light source or an electronic component is provided in a region where the second direction holding piece and/or the first direction holding piece is spaced apart from the vertex of the corner portion.

9. An electronic apparatus comprising the electro-optical device according to claim 1.

* * * * *